United States Patent [19]

Lakshmanan et al.

[11] 4,096,103

[45] Jun. 20, 1978

[54] PRESSURE-SENSITIVE ADHESIVE COMPOSITION

[75] Inventors: Pallavoor R. Lakshmanan, Houston, Tex.; Harold E. Swift, Gibsonia; Ching Yong Wu, Pittsburgh, both of Pa.

[73] Assignee: Gulf Research & Development Company, Pittsburgh, Pa.

[21] Appl. No.: 755,160

[22] Filed: Dec. 29, 1976

[51] Int. Cl.$^2$ .......................... C08K 5/01; C08K 5/07; C08K 5/10; C08L 93/04
[52] U.S. Cl. .................... 260/27 BB; 260/31.2 MR; 260/32.8 A; 260/33.6 A; 260/888; 260/894; 526/76; 526/337
[58] Field of Search ................. 260/27 BB, 33.6 UA, 260/888, 894, 31.2 MR, 32.8 A, 33.6 A; 526/339, 337, 76

[56] References Cited

U.S. PATENT DOCUMENTS 3,919,160   11/1975   Lakshmanan ................. 260/33.6 A

OTHER PUBLICATIONS

Skeist "Handbook of Adhesives" p. 586, Van Nostrand Reinhold Co., N.Y., copyright 1962.

*Primary Examiner*—Melvyn I. Marquis
*Assistant Examiner*—H. H. Fletcher

[57] ABSTRACT

A pressure-sensitive adhesive composition consisting essentially of a natural or synthetic tackifier, an elastomer comprising isoprene and piperylene and a solvent. The elastomer is preferably prepared from certain selected copolymerized $C_5$-hydrocarbons from a hydrocarbon mixture containing $C_5$-monoolefinic hydrocarbons, $C_5$-diolefinic hydrocarbons (cyclic and acyclic), $C_5$-paraffins, $C_6$-aliphatics, and benzene.

The elastomers thus formed, when mixed with certain natural or synthetic tackifiers, have the required tack of pressure-sensitive adhesives.

15 Claims, No Drawings

PRESSURE-SENSITIVE ADHESIVE COMPOSITION

BACKGROUND OF THE INVENTION

1. Field of the Invention

In recent years many petrochemical companies have become increasingly interested in the utilization of hydrocarbon by-products from ethylene plants because of the increased availability and lower costs of these hydrocarbons as compared with their polymer grade counterparts. It has now been discovered that elastomers synthesized from $C_5$-hydrocarbons, when used in combination with certain natural or synthetic tackifiers, are particularly suited for use as pressure-sensitive adhesives. This is very encouraging in view of existing natural resin shortages and the fact that the adhesives industry is placing increasing emphasis on adhesives containing tackifiers of synthetic origin. The adhesives as defined herein have superior characteristics such as tack, peel strength, creep, tensile strength, plasticity, and stability to oxygen and aging.

2. Description of the Prior Art

The use of an isoprene-piperylene copolymer in an adhesive composition is disclosed in U.S. Pat. No. 3,919,160 issued Nov. 11, 1976, to Lakshmanan for Adhesive Composition, which teaches an adhesive composition consisting of a styrene-butadiene block copolymer, a styrene-isoprene block copolymer, an isoprene-piperylene copolymer (tackifier) and a solvent. The adhesive composition fails, however, to appreciate the particular tackifier/elastomer and solvent combination in the adhesive composition disclosed herein which consists essentially of an isoprene-piperylene elastomer, a synthetic tackifier or a natural tackifier and solvent. Additionally, the adhesive composition disclosed in this reference is not used in context of a pressure sensitive adhesive (i.e. for masking tape, scotch tape, surgical tape, labels, etc.). Instead it is described as suitable for use in bonding wood, plastic, metal, a cellulosic material, such as paper, and glass, etc., to itself or to another member of such group.

SUMMARY OF THE INVENTION

The present invention encompasses a pressure-sensitive adhesive composition consisting essentially of a tackifier selected from the group consisting of:
(i) an isoprene-piperylene copolymer having a Ring and Ball softening point of about 10° C. to about 135° C., a molecular weight of about 400 to about 3000 and a weight ratio of isoprene to piperylene of about 1:10 to about 10:1;
(ii) a piperylene/2-methyl-2-butene copolymer having a Ring and Ball softening point of about 10° to about 135° C., a molecular weight of about 400 to about 3000 and a weight ratio of piperylene to 2-methyl-2-butene of about 1:10 to about 10:1;
(iii) beta terpene resins having a Ring and Ball softening point of about 10° C. to about 135° C. and a molecular weight of about 300 to about 3000; or
(iiii) rosin or rosin esters having a Ring and Ball softening point of about 10° C. to about 190° C. and a molecular weight of about 300 to about 3000;
in combination with an elastomer comprising isoprene and piperylene having a molecular weight of at least about 4,000, preferably at least about 10,000; and a solvent.

BRIEF DESCRIPTION OF INVENTION

The essential components of the pressure-sensitive adhesive compositions of this invention are:
(A) a natural or synthetic tackifier;
(B) an elastomer comprising isoprene and piperylene, preferably copolymerized $C_5$-hydrocarbons prepared from a hydrocarbon mixture containing $C_5$-monoolefinic hydrocarbons, $C_5$-diolefinic hydrocarbons (cyclic and acyclic) including cyclopentadiene, $C_5$-paraffins, $C_6$-paraffins and a solvent.

The tackifiers suitable for use herein can be either of natural or synthetic origin, for example any of the resinous substances known in the art for enhancing the tack of pressure-sensitive adhesive compositions.

Natural tackifiers are preferably selected from beta terpene resins having a Ring and Ball softening point of about 10° C. to about 135° C., at atmospheric pressure, and a molecular weight of about 300 to about 3000, such as Piccolyte S-100, which has a Ring and Ball softening point of about 100° C. at atmospheric pressure and a molecular weight of about 1100, marketed commercially by Hercules Chemical Co., and rosin or rosin esters having a Ring and Ball softening point of about 10° to about 190° C. at atmospheric pressure and a molecular weight of about 300 to about 3000, such as Zonester-85, a glycerol ester of tall oil rosin, which has a Ring and Ball softening point of about 85° C. at atmospheric pressure, and a molecular weight of about 1000 to about 1400, marketed commercially by Arizonia Chemicals.

Synthetic tackifiers which are especially suitable for use herein are preferably selected from isoprene-piperylene copolymers having a Ring and Ball softening point of about 10° C. to about 135° C. at atmospheric pressure, a molecular weight of about 400 to about 3000 and a weight ratio of isoprene to piperylene of about 1:10 to about 10:1, such as Sta-tac 100 which has a Ring and Ball softening point of about 105° C. at atmospheric pressure and a molecular weight of about 1000 to about 2000; and piperylene/2-methyl-2-butene copolymers having a Ring and Ball softening point of about 10° C. to about 135° C. at atmospheric pressure, a molecular weight of about 400 to about 3000 and a weight ratio of piperylene to 2-methyl-2-butene of about 10:1 to about 1:10, such as Wingtack 95, having a Ring and Ball softening point of about 95° C. at atmospheric pressure and a molecular weight of about 1000 to about 2000. It should be noted that the tackifiers suitable for use herein have a molecular weight below about 3000.

The elastomers as described herein are prepared from crude $C_5$-hydrocarbon fractions, particularly those obtained from cracked naphthas, as for example, in U.S. Pat. Nos. 2,719,853 and 2,773,838 to Reid et al. Naphtha is a volatile liquid hydrocarbon mixture produced by the fractional distillation of petroleum in the boiling range of from about 80.6° F. (27° C.) to about 500° F. (260° C.) which comprises acyclic and cyclic paraffins and olefins and aromatic hydrocarbons.

In a preferred mode, the elastomer herein is prepared from crude $C_5$-hydrocarbons which are by-products obtained from a feed stream comprising a hydrocarbon mixture in the production of ethylene. This hydrocarbon mixture contains $C_5$-monoolefinic hydrocarbons, $C_5$-diolefinic hydrocarbons (cyclic and acyclic), $C_5$-paraffins, a minor amount of $C_6$-aliphatics and benzene.

Isoprene and piperylene and other minor components in the $C_5$–$C_6$ hydrocarbon mixture are substantially separated from the undesirable components, namely C$_6$-hydrocarbons, cyclopentadiene, dicyclopentadiene, benzene and dimers of isoprene and piperylene in an autoclave under nitrogen atmosphere by heat-soaking the hydrocarbon mixture under conditions suitable for dimerizing cyclopentadiene, for example, at a temperature of about 122° F. (50° C.) to about 570° F. (300° C.), preferably about 230° F. (110° C.) to about 300° F. (150° C.), and a pressure of about 40 to about 1000 pounds per square inch gauge (about 3 to about 70 kilograms per square centimeter), preferably about 200 to 400 pounds per square inch gauge (about 14 to about 28 kilograms per square centimeter), for about 0.1 to about 10 hours, preferably for about one to about two hours. This operation dimerizes the cyclopentadiene to dicyclopentadiene and allows for easy separation of the remaining C$_5$-hydrocarbons containing isoprene and piperylene from the higher boiling components by any suitable means, for example, by distillation at a temperature of from about 50° F. (10° C.) to about 122° F. (50° C.), preferably about 90° F. (37° C.) to about 115° F. (46° C.), and a pressure from about 0 to about 40 pounds per square inch gauge (about 0 to about 2 kilograms per square centimeter) preferably about 0 to about 20 pounds per square inch gauge (about 0 to about 1 kilogram per square centimeter), for about 0.5 to about 5 hours, preferably about 0.5 to about 2 hours.

Isoprene and piperylene monomers, in admixture with the C$_5$-paraffins and C$_5$-olefins are preferably copolymerized in the presence of a catalyst system. Any conventional catalyst system suitable for promoting a copolymerization reaction at elevated temperatures to obtain an elastomer can be employed in the present invention. More particularly, the mixture containing isoprene and piperylene monomers is placed in a reaction vessel and optionally a solvent, such as toluene, is added to the mixture. A preferred catalyst system for use herein comprises an iron complex, a trialkyl aluminum and a bidentate ligand capable of both pi and sigma bonding. Examples of such catalyst systems include an (A) iron complex selected from iron (III) acetylacetonae, iron (III) naphthenate, or iron octoate, (B) a trialkyl aluminum compound such as triethyl aluminum, triisopropyl aluminum and the like and (C) a bidentate ligand such as 2-cyanopyridine, phenyl-2-pyridylacetonitrile, 2-pyridylaldoxime and the like which are added to the reaction vessel and the system is flushed with nitrogen. A typical catalyst system is selected from (i) iron (III) acetylacetonate, triethylaluminum, 2-cyanopyridine; (ii) iron (III naphthenate, tributyl aluminum, 2-cyanopyridine; (iii) iron (III octoate, triethylaluminum, phenyl 2-pyridylacetonitrile. The catalyst system is added to the reaction vessel at a concentration of about 0.01 to about 10 weight percent, preferably about 0.1 to about 5 weight percent of the final C$_5$-hydrocarbon mixture. The polymerization of olefins and diolefins such as isoprene and piperylene is set forth in greater detail in U.S. Pat. No. 3,703,483, issued to Bozik et al, Nov. 21, 1972, for "Polymerization Process and Catalyst System Therefor", and U.S. Pat. No. 3,754,048, issued on Aug. 21, 1973 to Wu et al, for "Diene Polymerization", the disclosures of which are incorporated herein by reference. More particularly, the reaction mixture is reacted at a temperature of from about 14° F. (−10° C.) to about 212° F. (100 C.) at a pressure of from about 0 psi (0 kg./cm$^2$) to about 400 psi (28 kg./cm$^2$) for about 1 to 24 hours, preferably from about 77° F. (25° C.) to about 122° F. (50° C.) at a pressure of about 0 psi (0 kg./cm$^2$) to about 200 psi (14 kg./cm$^2$) for about 2 to about 6 hours. For example, in a particular preferred embodiment the reaction mixture is stirred at room temperature for 4 hours or until the copolymerization reaction is complete. The copolymer is next added to sufficient methyl alcohol containing enough hydrochloric acid to inactivate the catalyst. The copolymer is recovered using conventional methods, for example, filtration, and dried under vacuum at room temperature overnight. The resulting elastomer composition is exemplified by Table I below.

Table I
COPOLYMERIZED ELASTOMER

| Component | Weight Percent | |
|---|---|---|
| | Broad Range | Preferred Range |
| Isoprene | 20 to 90 | 50 to 80 |
| Piperylene | 5 to 60 | 20 to 50 |
| C$_5$-paraffin and C$_5$ olefin | 0 to 5 | 0 to 3 |

The elastomer produced herein will primarily be composed of isoprene and piperylene and, in general, have a molecular weight greater than about 4000 with a preferred molecular weight range of from about 10,000 to about 1,000,000. The isoprene and piperylene are present in the copolymer composition at a molar ratio range of from about 10:1 to about 1:2 respectively, preferably from about 5:1 to about 1:1 respectively and comprise at least 95 percent by weight of the elastomer. As a result of removal of the cyclopentadiene from the hydrocarbon mixture prior to polymerization, improved polymer yields (isoprene-piperylene copolymer admixed with minor amounts of paraffin and olefin) are obtained.

A particularly desirable process for preparing the elastomers suitable for use herein is disclosed in greater detail in the concurrently filed application of Lakshmanan, et al, entitled "Process for Preparing Elastomers for Pressure-Sensitive Adhesive Application", Ser. No. 755,161, filed Dec. 29, 1976, the disclosure of which is incorporated herein by reference. The elastomers are made from a hydrocarbon mixture containing C$_5$-monoolefinic hydrocarbons, C$_5$-diolefinic hydrocarbons, C$_5$-paraffins, C$_6$-paraffins and benzene, which comprises (A) heat-soaking said hydrocarbon mixture at a temperature sufficient to dimerize cyclopentadiene; (B) separating the resulting hydrocarbon mixture from the cyclopentadiene dimer; and (C) copolymerizing the resulting hydrocarbon mixture in the presence of a catalyst which comprises an iron complex, a trialkyl aluminum and a bidentate ligand capable of both pi and sigma bonding.

The last component required herein is a solvent or mixtures thereof boiling between about 50° C. to about 145° C., preferably between about 55° C. to about 120° C., at atmospheric pressure. It should be noted that the solvents herein serve to dilute the adhesive composition, thus allowing ease of application of the adhesive for a variety of purposes. For example, the solvent aids the process of applying the pressure-sensitive adhesive to a substrate, such as tape backing by making the adhesive more fluid and thus easier to form a film on said substrate. The solvent can then be conveniently evaporated to produce the desired adhesive film with the requisite tack. Solvents which can be used are aromatics having from six to eight carbon atoms, such as toluene, the xylenes, etc.; aliphatics having from six to eight carbon atoms, such as normal hexane, normal octane, etc., ketones having from three to four carbon atoms, such as methyl ethyl ketone, acetone, etc., esters having from two to four carbon atoms, such as ethyl acetate, butyl acetate, and mixtures thereof. The amount of solvent relative to the combined weight of the elastomer and the tackifier, on a weight basis can be in the range of about 30 to about 900 percent, preferably about 40 to about 400 percent.

The pressure-sensitive adhesive compositions herein will consist essentially of the following components in the following weight ranges:

Table II

| Component | Weight Percent | |
|---|---|---|
| | Broad Range | Preferred Range |
| Elastomer | 5 to 35 | 10 to 25 |
| Tackifier | 5 to 35 | 5 to 35 |
| Solvent | 30 to 90 | 40 to 85 |

The pressure-sensitive adhesive compositions of this invention can conveniently be prepared using conventional methods. For example, the various components of the composition can be admixed together in any order although it may be desirable to add either the elastomer and/or the tackifier to the solvent for ease of mixing. Next, mixing can take place until a substantially homogeneous mixture is obtained. Such mixing can be carried out at ambient temperature and pressure over a period of about one to about four hours, or, alternatively the adhesive components can be mixed and set aside for about 24 hours to allow for complete dissolution of the various components.

Pressure-sensitive adhesives are generally used in the form of adhesive tapes, or similar articles, the function of said adhesive being to bond the tape backing to the surface of some other substrate or material. These adhesives differ from other types of adhesives in that they bond immediately upon application with slight pressure without physical or chemical changes taking place in the adhesive layer being involved. Another requirement for pressure-sensitive adhesives is that they are easily removed from the surfaces to which they have been applied. Thus, the physical characteristics of a pressure-sensitive adhesive composition are very important; because they define the parameters which distinguish the pressure-sensitive adhesive from other types of adhesives.

The adhesives described herein are of the pressure-sensitive type which must exhibit a bond strength sufficient to provide bonding characteristics suitable for use in pressure-sensitive adhesive applications. The bonding qualities of the adhesives herein are best defined by the "tack" which is an experimentally determined parameter. One simple method of measuring the bonding strength, or tack, of pressure-sensitive adhesives of the type employed herein involves the use of a probe tack tester which measures the force required to separate an adhesive and adherent at an interface shortly after they have been brought into contact under a defined weight or pressure of known duration and at a specified temperature. The probe tack test used to define the adhesives employed in the instant invention is standarized, designed and operated according to ASTM Designation: D-2979-71, the disclosure of which is incorporated herein by reference. Under the condition of this test, the adhesives described herein have a pressure-sensitive tack of at least about 100 g/cm$^2$.

Another critical aspect of the adhesives herein is peel strength, which is a convenient measure of strippability. Indeed, a useful method of characterizing any adhesive bond involves testing for peel or stripping strength. Peel strength is the force required to remove a pressure-sensitive tape or adhesive material from a panel (or its own backing) at a specified angle and speed. The peel or stripping test used to define the adhesives herein is conducted utilizing a power-driven machine with a constant rate-of-jaw separation, and is conducted according to ASTM Designation: D-903-49. The adhesives used in the present invention are characterized by a peel strength of at least 100 g/cm.

DESCRIPTION OF PREFERRED EMBODIMENTS

Several pressure-sensitive adhesive compositions were prepared and evaluated according to the methods and procedures set forth above. The data obtained are tabulated in Table III below.

Table III

| Run No. | Weight Percent | | | |
|---|---|---|---|---|
| | I | II | III | IV |
| Piccolyte S-100[1] | 10 | — | — | — |
| Zonester 85[2] | — | 10 | — | — |
| Wingtac 95[3] | — | — | 10 | — |
| Sta-tack 100[4] | — | — | — | 10 |
| Elastomer[5] | 10 | 10 | 10 | 10 |
| Toluene | 80 | 80 | 80 | 80 |
| Tack, g/cm$^2$ (ASTM: D-2979-71) | 261 | 340 | 393 | 431 |
| Peel Strength, g/cm (ASTM: D-903-49) | 110 | 241 | 310 | 268 |

[1] A beta terpene resin tackifier marketed by Hercules Chemicals Company.
[2] A glycerol ester of tall oil rosin marketed by Arizonia Chemicals.
[3] A piperylene/2-methly-2-butene copolymer marketed by The Goodyear Company.
[4] An isoprene-piperylene based copolymer having a molecular weight of about 3000 or less marketed by Rheichold Chemicals Company.
[5] An isoprene-piperylene copolymer having a molecular weight greater than 10,000 prepared from C$_5$-hydrocarbons obtained from an ethylene plant feed stream by steam-heating the C$_5$-hydrocarbons in an autoclave under a nitrogen atmosphere at 257° F. (125° C.) and a pressure of 300 pounds per square inch gauge (21 kilograms per square centimeter) for two hours to dimerize cyclopentadiene. The C$_5$-hydrocarbons were next separated from the other components by vacuum distillation. The elastomer was prepared by adding 300 ml of the treated C$_5$-hydrocarbon fraction, and a catalyst comprising 2.0 grams of phenyl-2-pyridylacetonitrile, 3.5 grams of iron III acetylacetonate, and 4.0 ml of triethylaluminum to a reaction vessel. The reaction mixture was stirred at room temperature for four hours. The catalyst was inactivated by adding 50 cc of methyl alcohol containing 5 cc of hydrochloric acid to the elastomer (e.g. a sufficient amount to inactivate the catalyst). The elastomer was recovered using conventional methods, for example, filtering the product from the other hydrocarbons, and dried under vacuum at room temperature overnight.

The pressure-sensitive adhesives were formulated by preparing a 20 percent by weight solution of the tackifier in toluene and a 20 percent by weight solution of the elastomer in toluene. The solutions were mixed using conventional apparatus for 10 hours.

The data in Table III above illustrates the effectiveness of the pressure-sensitive adhesive compositions of the present invention.

Various modifications of the composition and method of the invention may be made without departing from the spirit and scope thereof and it is to be understood that the invention is to be limited only by the appended claims.

We claim:

1. A pressure-sensitive adhesive composition consisting essentially of a tackifier selected from the group consisting of:
   (i) an isoprene-piperylene copolymer having a Ring and Ball softening point of about 10° to about 135° C., a molecular weight of about 400 to about 3000 and a weight ratio of isoprene to piperylene of about 1:10 to about 10:1;

(ii) a piperylene/2-methyl-2-butene copolymer having a Ring and Ball softening point of about 10° to about 135° C., a molecular weight of about 400 to about 3000 and a weight ratio of piperylene to 2-methyl-2-butene of about 1:10 to about 10:1;

(iii) beta terpene resins having a Ring and Ball softening point of about 10° to about 135° C. and a molecular weight of about 300 to about 3000; and (iiii) rosin or rosin esters having a Ring and Ball softening point of about 10° to about 190° C. and a molecular weight of about 300 to about 3000;

in combination with an elastomer comprising isoprene and piperylene having a molecular weight of at least about 40,000; and a solvent; said elastomer having been prepared by a process for preparing an elastomer comprising copolymerized $C_5$-hydrocarbons prepared from a hydrocarbon mixture containing $C_5$-monoolefinic hydrocarbons, $C_5$-diolefinic hydrocarbons, $C_5$-paraffins, $C_6$-paraffins and benzene, which comprises (A) heat-soaking said hydrocarbon mixture at a temperature sufficient to dimerize cyclopentadiene; (B) separating the resulting hydrocarbon mixture from the cyclopentadiene dimer; and (C) copolymerizing the resulting hydrocarbon mixture in the presence of a catalyst which comprises an iron complex, a trialkyl aluminum and a bidentate ligand capable of both pi and sigma bonding, the weight percents of the three components being 5–35 elastomer, 5–35 tackifier, and 30–90 solvent.

2. The pressure-sensitive adhesive composition of claim 1 wherein said adhesive composition contains the following components in the following amounts:

| Component | Weight Percent |
|---|---|
| Tackifier | 10 to 25 |
| Elastomer | 5 to 35 |
| Solvent | 40 to 85. |

3. The pressure-sensitive adhesive composition of claim 2 wherein said tackifier has a molecular weight of about 300 to about 3000.

4. The pressure-sensitive adhesive composition of claim 1 wherein said elastomer contains the following components in the following amounts:

| Component | Weight Percent |
|---|---|
| Isoprene | 20 to 90 |
| Piperylene | 5 to 60 |
| $C_5$-paraffin and $C_5$-olefin | 0 to 5. |

5. The pressure-sensitive adhesive composition of claim 4 wherein said elastomer contains the following components in the following amounts:

| Component | Weight Percent |
|---|---|
| Isoprene | 50 to 80 |
| Piperylene | 20 to 50 |
| $C_5$-paraffin and $C_5$-olefin | 0 to 3. |

6. The pressure-sensitive adhesive composition of claim 5 wherein the elastomer comprises at least 95 percent by weight of isoprene and piperylene.

7. The pressure-sensitive adhesive composition of claim 6 wherein the elastomer comprises isoprene and piperylene in a molar ratio range of from about 10:1 to about 2:1 respectively.

8. The pressure-sensitive adhesive composition of claim 7 wherein the elastomer comprises isoprene and piperylene in a molar ratio range of from about 5:1 to about 1:1 respectively.

9. The pressure-sensitive adhesive composition of claim 8 wherein the elastomer has a molecular weight range of from about 10,000 to about 1,000,000.

10. The pressure-sensitive adhesive composition of claim 9 wherein the $C_5$-paraffin comprises normal pentane, isopentane and mixtures thereof.

11. The pressure-sensitive adhesive composition of claim 10 wherein the $C_5$-olefin comprises pentenes, methyl-butenes and mixtures thereof.

12. The pressure-sensitive adhesive composition of claim 1 wherein the elastomer to tackifier ratio is from about 10:1 to 1:10.

13. The pressure-sensitive adhesive composition of claim 1 wherein said solvent is selected from toluene, hexane, acetone, methyl ethyl ketone, ethyl acetate, butyl acetate, benzene and mixtures thereof.

14. The pressure-sensitive adhesive composition of claim 13 wherein said solvent comprises about 30 percent by weight to about 900 percent by weight of the combined weight of the tackifier elastomer.

15. The pressure-sensitive adhesive composition of claim 14 wherein said solvent comprises from about 40 percent by weight to about 400 percent by weight of the combined weight of the tackifier and elastomer.

* * * * *

UNITED STATES PATENT OFFICE
CERTIFICATE OF CORRECTION

Patent No. 4,096,103      Dated June 20, 1978

Inventor(s) Pallavoor R. Lakshmanan, Harold E. Swift and Ching-Yong Wu.

It is certified that error appears in the above-identified patent and that said Letters Patent are hereby corrected as shown below:

Col. 7, line 18 [40,000] should read 4,000.

Col. 8, line 1 [compenent] should read component.

Col. 8, line 46, after comprises, add from.

Col. 8, line 48, after tackifier, add and.

Signed and Sealed this

Nineteenth Day of December 1978

[SEAL]

Attest:

RUTH C. MASON
Attesting Officer

DONALD W. BANNER
Commissioner of Patents and Trademarks